(12) United States Patent
Mills et al.

(10) Patent No.: US 11,319,743 B2
(45) Date of Patent: May 3, 2022

(54) HYDRAULIC DAMPER WITH COMPRESSED GAS EXTEND ASSIST

(71) Applicant: Parker-Hannifin Corporation, Cleveland, OH (US)

(72) Inventors: Ryan L. Mills, Kalamazoo, MI (US); Andrew G. Bornhorst, Richland, MI (US); Russell L. Evans, Portage, MI (US); Andrew D. Pherson, Kalamazoo, MI (US)

(73) Assignee: Parker-Hannifin Corporation, Cleveland, OH (US)

( * ) Notice: Subject to any disclaimer, the term of this patent is extended or adjusted under 35 U.S.C. 154(b) by 255 days.

(21) Appl. No.: 16/500,130

(22) PCT Filed: Apr. 27, 2018

(86) PCT No.: PCT/US2018/029810
§ 371 (c)(1),
(2) Date: Oct. 2, 2019

(87) PCT Pub. No.: WO2018/200964
PCT Pub. Date: Nov. 1, 2018

(65) Prior Publication Data
US 2021/0285274 A1 Sep. 16, 2021

Related U.S. Application Data

(60) Provisional application No. 62/491,456, filed on Apr. 28, 2017.

(51) Int. Cl.
*E05F 15/53* (2015.01)
*F16F 9/512* (2006.01)

(52) U.S. Cl.
CPC ............... *E05F 15/53* (2015.01); *F16F 9/512* (2013.01); *E05Y 2201/454* (2013.01);
(Continued)

(58) Field of Classification Search
CPC ............... E05F 15/53; E05Y 2201/454; E05Y 2201/68; E05Y 2201/458; E05Y 2900/531;
(Continued)

(56) References Cited

U.S. PATENT DOCUMENTS 1,230,290 A 6/1917 Geiger
2,722,342 A 11/1955 Fox
(Continued)

FOREIGN PATENT DOCUMENTS

DE 3517133 A1 11/1986
GB 1113563 A 5/1968
(Continued)

OTHER PUBLICATIONS

Halkey Roberts Manual/Automatic Inflators; 840 Manual Inflator; dated Feb. 8, 2017; available at http://www.halkeyroberts.com/products/inflation/manualautomatic-inflators-new/840-manual-inflator.aspx.
(Continued)

*Primary Examiner* — Justin B Rephann
(74) *Attorney, Agent, or Firm* — Renner, Otto, Boisselle & Sklar, LLP

(57) ABSTRACT

A dampening system (28) that includes an actuation state and/or a door actuation system that includes a single-use pressurized tank (34). The dampening system or the door actuation system may include a damper (30) and a fluid pressure source (e.g., the single-use pressurized tank (34)) that pressurizes the damper to actuate from a first position to a second position. The pressurization allows the damper to actuate another component, such as a vehicle door (26) that is operably coupled to the damper. A user may shift the damper into the actuation state to actuate the vehicle door open during an emergency, such as when a military vehicle
(Continued)

is on its side after an explosion knocks over the vehicle and the vehicle door is too heavy for the user to open without assistance.

20 Claims, 6 Drawing Sheets

(52) U.S. Cl.
CPC ..... *E05Y 2201/458* (2013.01); *E05Y 2201/68* (2013.01); *E05Y 2800/252* (2013.01); *E05Y 2900/504* (2013.01); *E05Y 2900/531* (2013.01)

(58) Field of Classification Search
CPC .......... E05Y 2900/504; E05Y 2800/252; F16F 9/512
See application file for complete search history.

(56) References Cited

U.S. PATENT DOCUMENTS

| | | | |
|---|---|---|---|
| 4,083,187 A | 4/1978 | Nagashima | |
| 6,247,471 B1 | 6/2001 | Bower | |
| 6,837,245 B2 | 1/2005 | Matheny | |
| 7,114,431 B1 | 10/2006 | Holder | |
| 7,118,472 B2 * | 10/2006 | Kennedy | F15B 11/076 454/169 |
| 7,178,547 B2 | 2/2007 | Mackal | |
| 7,673,647 B2 | 3/2010 | Mackal | |
| 7,726,722 B2 * | 6/2010 | Ray | E05F 15/70 296/146.4 |
| 8,096,603 B2 | 1/2012 | Cassady | |
| 8,739,466 B2 | 6/2014 | Kristerson | |
| 2006/0010769 A1 * | 1/2006 | Pelz | B64C 1/1423 49/141 |
| 2009/0094897 A1 * | 4/2009 | Gregg | B60P 1/4421 49/137 |
| 2010/0263280 A1 * | 10/2010 | Cassaday | E05F 15/53 49/32 |
| 2010/0313477 A1 * | 12/2010 | McKee | E05F 15/60 49/28 |
| 2012/0180469 A1 | 7/2012 | Knepple | |

FOREIGN PATENT DOCUMENTS

| | | |
|---|---|---|
| WO | 2010123486 A1 | 10/2010 |
| WO | 2013004690 A1 | 1/2013 |

OTHER PUBLICATIONS

International Search Report and Written Opinion for corresponding International Application No. PCT/US2018/029810 dated Feb. 20, 2019.
International Search Report and Written Opinion for corresponding International Application No. PCT/US2018/029810 dated Jul. 24, 2018.
Pneumatic Door Assist System for Armored Vehicles / Economical Design for Maximum Performance & Safety; dated Oct. 2011; available at https://www.parker.com/literature/Literature%20Files/pneumatic/Literature/Actuator-Cylinder/Bulletin%200600-B85%20(Door%20Assist).pdf.
Leland Limited; High Pressure Gas Filled Disposable Capacity; dated Feb. 8, 2017; available at http://www.lelandltd.com/disposable_gas_cyl.htm.

* cited by examiner

HYDRAULIC DAMPER WITH COMPRESSED GAS EXTEND ASSIST

This application is a national phase of International Application No. PCT/US2018/029810 filed Apr. 27, 2018 and published in the English language, which claims benefit of U.S. Provisional Application No. 62/491,456 filed on Apr. 28, 2017, which are hereby incorporated herein by reference.

RELATED APPLICATIONS

This application claims the benefit of U.S. Provisional Application No. 62/491,456 filed Apr. 28, 2017, which is incorporated herein by reference.

FIELD OF INVENTION

The present invention relates generally to hydraulic dampers, and more particularly to hydraulic dampers with single-use compressed gas extension assistance for vehicle doors.

BACKGROUND

Often vehicles, such as military ground vehicles, include hydraulic dampers attached to doors of the vehicle for various purposes such as 1) smoothing motion of the door opening and closing; 2) independently limiting the opening and closing speed of the door; and 3) locking the door's position at any point in its travel. Some hydraulic dampers allow the speed control and lock to be overridden when a certain level of force is imparted in either a closing or opening direction.

Some vehicles are equipped with a separate door assistance system that includes a compressor and an actuator to repeatedly open or close the vehicle doors. These door assistance systems can add a significant amount of weight and cost to the vehicle, and can require a significant amount of complexity to integrate into an existing vehicle.

SUMMARY OF INVENTION

The present invention provides a dampening system that includes an actuation state and/or provides a door actuation system that includes a single-use pressurized tank. The dampening system or the door actuation system may include a damper and a fluid pressure source (e.g., the single-use pressurized tank) that pressurizes the damper to actuate the damper from a first position to a second position. The pressurization allows the damper to actuate another component, such as a vehicle door that is operably coupled to the damper. A user may shift the damper into the actuation state to actuate the vehicle door open during an emergency, such as when a military vehicle is on its side after an explosion knocks over the vehicle and the vehicle door is too heavy for the user to open without assistance.

The dampening system may be lighter, less expensive, and less complicated than previously known door assistance systems that require a compressor and fluid lines run to each door of the vehicle. An embodiment of the dampening system includes a hydraulic damper, and does not require a compressor or a separate actuator. For example, the single-use pressurized tank is able to provide enough force to actuate the hydraulic damper when the dampening system is in an actuation state.

The dampening system is able to shift from a first state (e.g., a dampening state) to the actuation state. An embodiment of the dampening system includes an activation valve that shifts the damper from the dampening state to the actuation state. The activation valve, which may include a handle and a puncture pin, may be operably coupled to a pressure source such that when the activation valve moves from a first position to a second position, the dampening system shifts from the dampening state into the actuation state.

The dampening system may include a reset lock, such as a retaining ring that is disposed within a retaining ring slot to engage a reset notch of a puncture pin. The reset lock indicates to the user whether the dampening system has transitioned into the actuation state. The reset lock may not allow the dampening system to reset after the dampening system transitions into the actuation state, unless the reset lock is unlocked. When locked, the position or state of the reset lock may itself visually indicate to the user that the dampening system has transitioned into the actuation state, or the relative position of other components (e.g., the activation valve or the damper) locked by the reset lock may visually indicate to the user that the dampening system has transitioned into the actuation state.

When in the actuation state, the dampening system may be sealed to prevent the corresponding door from moving. The activation valve or another component may shift the dampening system into a venting state to allow the door to move.

Any of the damper, the activation valve, the reset lock, and the sealing and venting functions may be independently combined with one another or utilized separately. Thus, an actuation system of the present invention may include all of, any one of, or any combination of the damper, the activation valve, the reset lock, and the sealing and venting functions.

According to one aspect of the invention, a dampening system includes a damper having an interior chamber, a base end, and a movable end that is actuatable relative to the base end based on a pressure within the interior chamber, a fluid line fluidly connected to the interior chamber, a fluid pressure source fluidly connectable to the interior chamber through the fluid line, and an activation valve operably coupled to the damper and to the fluid pressure source, and wherein when the activation valve is in a first position the fluid pressure source is not fluidly connected to the interior chamber, and wherein when the activation valve shifts to a second position the damper is shifted into an actuation state where the fluid pressure source is fluidly connected to the interior chamber such that the fluid pressure source would pressurize the interior chamber, thereby actuating the movable end of the damper relative to the base end.

According to another aspect of the invention, a door positioning system includes a housing defining a doorway, a door that is movably coupled to the housing such that the door is movable from a closed position where the door blocks the doorway to an open position, a door actuation system that includes, an actuator having an interior chamber, a base end, and a movable end that is actuatable relative to the base end based on a pressure within the interior chamber, wherein the actuator is coupled to the door, a fluid line fluidly connected to the interior chamber, a single-use pressurized tank fluidly connectable to the interior chamber through the fluid line, and an activation valve operably coupled to the actuator and to the single-use pressurized tank, and wherein when the activation valve is in a first position the single-use pressurized tank is not fluidly connected to the interior chamber, and wherein when the activation valve shifts to a second position the actuator is shifted into an actuation state where the single-use pressurized tank is fluidly connected to the interior chamber to pressurize the interior chamber, thereby actuating the movable end of the actuator relative to the base end and moving the door between the closed position and the open position.

The foregoing and other features of the invention are hereinafter described in greater detail with reference to the accompanying drawings.

DETAILED DESCRIPTION

The principles of this present application have particular application to dampers for dampening movement of doors, such as armored vehicle doors, and thus will be described below chiefly in this context. It will be appreciated that principles of this invention may be applicable to other dampers or to actuator assemblies where is it desirable to actuate an object.

Figure 1:
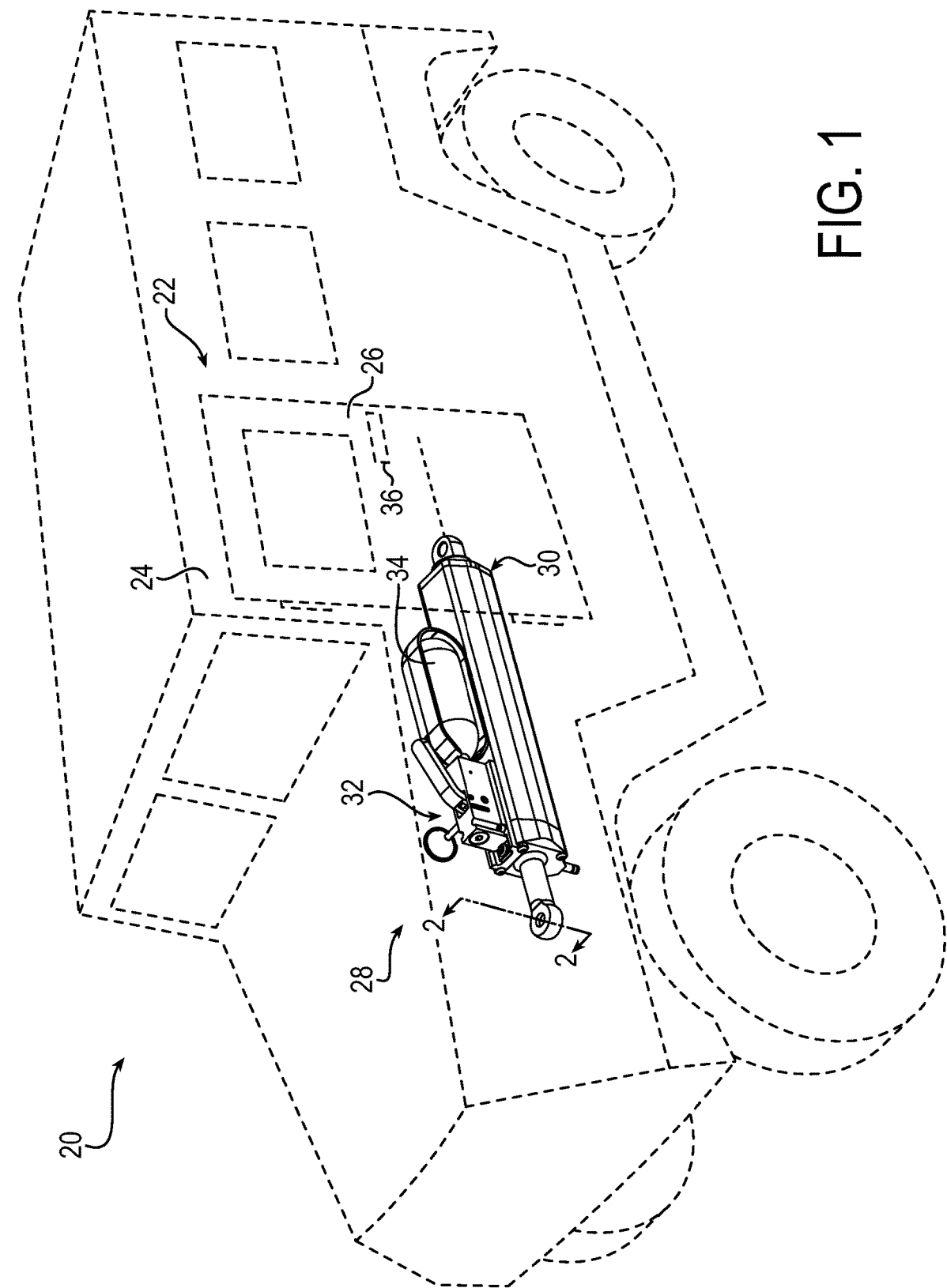
FIG. 1 is an oblique view of an exemplary door positioning system including an exemplary dampening system, and a schematic view of a vehicle housing.

Referring now in detail to the drawings, and initially to FIG. 1, a vehicle, such as an armored military ground transport vehicle, is illustrated schematically at 20. The vehicle 20 may include a door positioning system 22 that includes a door housing 24 defining a doorway, a door 26 coupled to the door housing 24, and a dampening system 28 (an example of a door actuation system) coupled to the door 26 and another portion of the vehicle (e.g., the door housing 24). The dampening system 28 may be smaller in scale. In an embodiment, the dampening system has a length slightly shorter than a length of the door.

The door 26 is movably coupled to the door housing 24 such that the door is movable from a closed position where the door 26 blocks the doorway to an open position. When the dampening system 28 is in an actuation state, the dampening system 28 actuates the door 26. The door 26 may be actuated from the closed position to the open position so that a user inside the vehicle 20 is able to exit the vehicle through the doorway.

The dampening system 28 may include a damper 30 attached to the door 26 (represented by dashed lines), an activation valve 32 operably coupled to the damper 30, and a fluid pressure source (e.g., a single-use pressurized tank 34) fluidly connectable to the damper 30. When the single-use pressurized tank 34 is fluidly connected to the damper 30, the damper 30 may actuate the door 26. In an embodiment, the activation valve is operably coupled to the damper by fluidly connecting the activation valve to the damper without mechanically coupling the activation valve to the damper.

The door 26 may include a door handle 36 that is movable from a closed position to an open position to allow a user to unlatch and open the door 26. The door handle 36 may be functionally independent of the damper such that when the door handle 36 moves between the closed and open positions, the functionality of the damper 30 is not altered. For example, the damper 30 is able to remain in or transition into a dampening state regardless of whether the door handle 36 is in the closed position or in the open position. Also, the damper 30 is able to remain in or transition into the actuation state regardless of whether the door handle 36 is in the closed position or in the open position.

Figure 2:
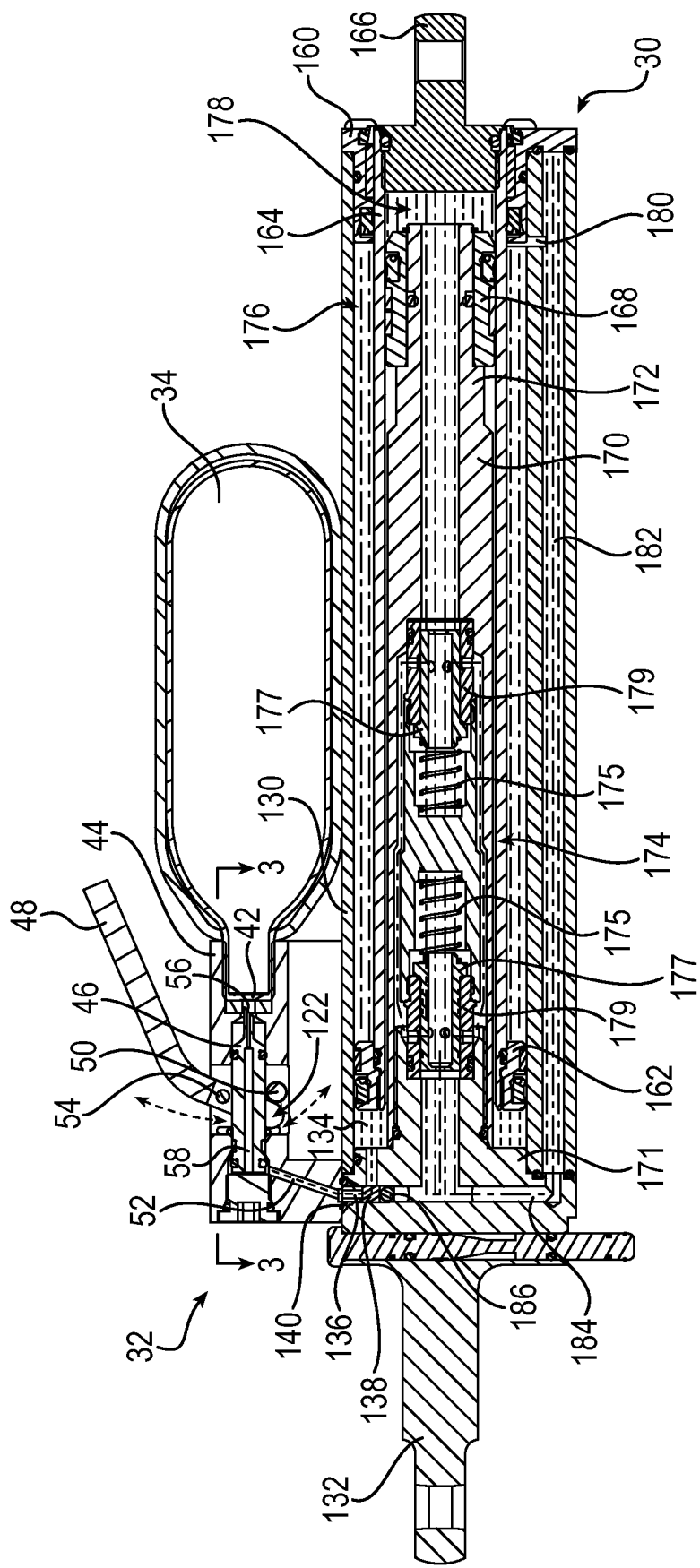
FIG. 2 is a front cross-sectional view of the dampening system of FIG. 1.

Referring now to FIG. 2, the single-use pressurized tank 34 may be a compressed nitrogen gas disposable cylinder with a puncture cap 42 that has a capacity anywhere from 43.0 cubic centimeters (cc) to 95 cc. In an embodiment, the single-use pressurized tank has a capacity anywhere from 25 cc to 500 cc. In another embodiment, the fluid pressure source is a reusable tank that is provided with compressed gas by a compressor after each use.

The activation valve 32 may include an activation valve body 44, a puncture pin 46 movable within the activation valve body 44, a handle 48, and an actuation lock 50. The activation valve body 44 may define an activation valve fluid line 52 that is connectable to the damper 30.

The fluid line 52 may not include a pressure regulator that would limit pressure of fluid within the fluid line 52. For example, the fluid line 52 does not include a pressure regulator that would limit the pressure of fluid that flows through the fluid line 52 to the damper 30, and the fluid line 52 does not include a pressure regulator that would limit the pressure of fluid that flows from the damper 30 through the fluid line 52.

The handle 48 may be movably coupled to activation valve body 44, and operably coupled to the puncture pin 46 such that movement of the handle 48 from a first handle position to a second handle position actuates the puncture pin 46. For example, the activation valve 32 includes a handle pin 54 that rotatably couples the handle 48 to the activation valve body 44.

The puncture pin 46 includes a pointed end 56 for puncturing the puncture cap 42 and an axial through passage 58 that fluidly connects the activation valve fluid line 52 of the damper 30 to the pointed end 56. The axial through passage 58 allows the puncture pin 46 to be pressure balanced at both axial ends of the puncture pin 46. In another embodiment, the puncture pin does not include an axial through passage and the activation valve passage is fluidly connected to an area adjacent to the pointed end by another passage, such as a passage in the activation valve body.

Figure 3:
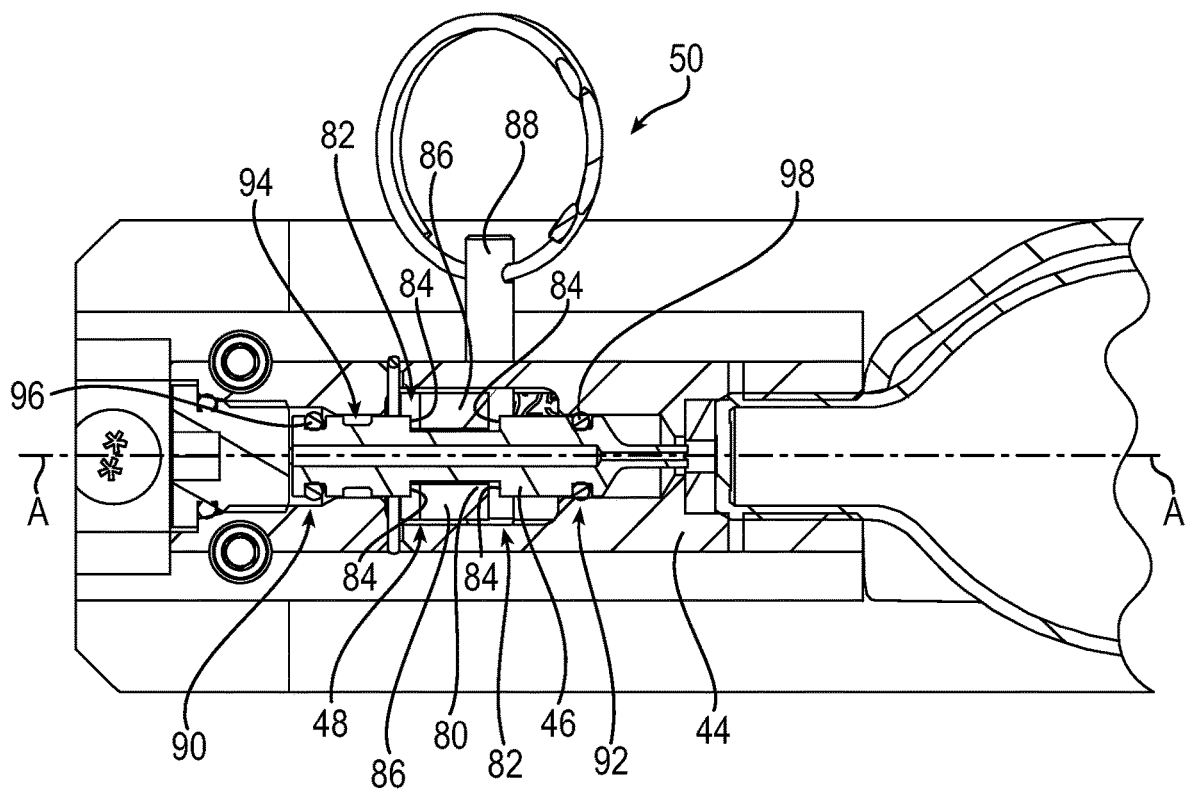
FIG. 3 is a top cross-sectional view of a portion of the dampening system of FIG. 2.

Referring briefly to FIG. 3, the handle 48 (partially shown and labeled with an arrow) may include a camming end 80 that is engageable with the puncture pin 46. The puncture pin 46 may include radially outward facing notches 82 that are partially defined by axially facing surfaces 84.

The camming end 80 may include two forked camming legs 86 that are engageable with corresponding axially facing surfaces 84 of the puncture pin 46. In an embodiment, the activation valve includes a handle that is operably coupled to a camming pin such that when the handle rotates, the camming pin rotates to actuate the puncture pin. In another embodiment, the activation valve includes a button that is biased in a first position, and the puncture pin is biased to actuate toward the fluid pressure source when the button is pressed by the user. In another embodiment, the activation valve includes a vent valve fluidly connected to the fluid line, and includes a handle that is movable into a third handle position where the handle engages a vent valve to vent the pressure in the fluid line.

The actuation lock 50 may have a locked and an unlocked state, as discussed further below with reference to FIGS. 4 and 8. The actuation lock 50 may include a removable pin 88 that is slidably attached to the activation valve body 44. When the removable pin 88 is in an unlocked position and the handle 48 is movable from the first handle position.

The puncture pin 46 may include seal notches 90 and 92 at opposite axial ends and a reset notch 94, each of which may circumscribe a central axis A. A vent seal 96 (e.g., an O-ring) may be disposed in the seal notch 90 to be engageable with the activation valve body 44. A second seal 98 (e.g., an O-ring) may be disposed in the seal notch 92 to engage the activation valve body 44.

Figure 4:
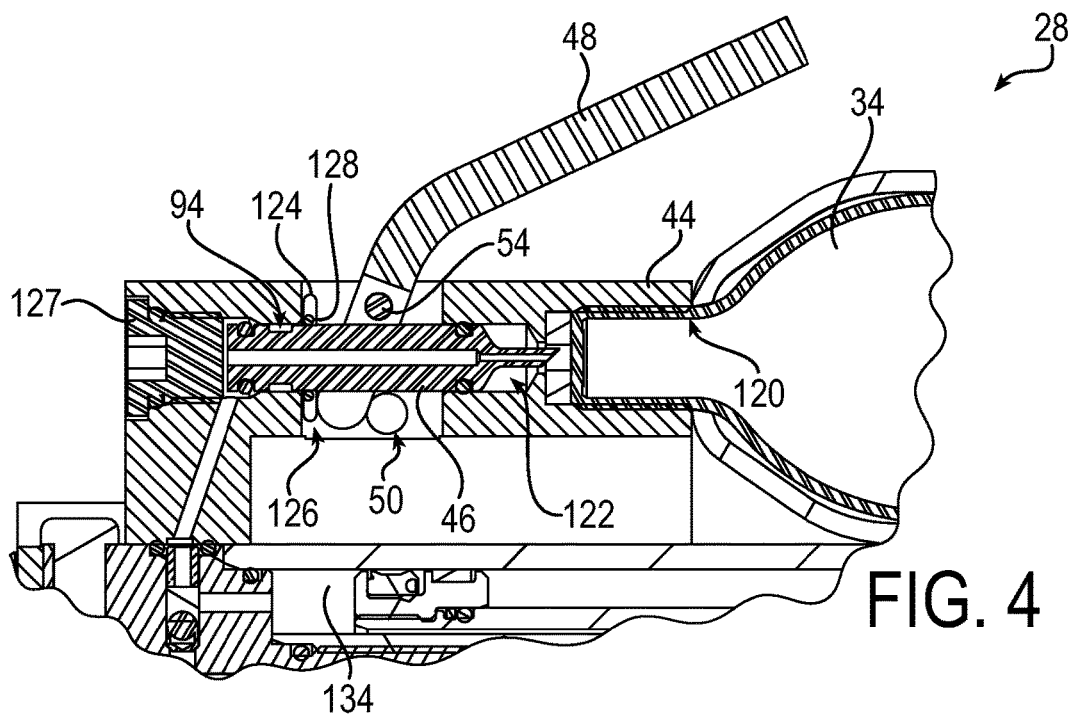
FIG. 4 is a partial front cross-sectional view of the dampening system of FIG. 2 in an unlocked dampening state.

Referring briefly to FIG. 4, the activation valve body 44 may include a fluid pressure source input 120, a puncture pin shaft 122, and a retaining ring slot 124 of a reset lock 126. The fluid pressure source input 120 may include a threaded opening that couples to radially outwardly facing threads of the single-use pressurized tank 34. The puncture pin shaft 122 may have an end that is closed by a cap 127 adjacent to the puncture pin 46 that is disposed within the puncture pin shaft 122.

The reset lock 126 may be operably coupled to the handle 48 such that when the handle 48 is in the second handle position the reset lock 126 prevents the handle 48 from returning to the first handle position. For example, the reset lock 126 includes the retaining ring slot 124, a retaining ring 128, and the reset notch 94. The retaining ring slot 124 restricts axial movement of the retaining ring 128 toward or away from the single-use pressurized tank 34. When in an unlocked state, the retaining ring 128 is radially outwardly tensioned and abuts a radially outer surface of the puncture pin 46. When in a locked state (shown in FIG. 7), the retaining ring 128 is radially constricts and is disposed within the reset notch 94.

In an embodiment, the reset lock is another locking mechanism that prevents the activation valve from moving into a first position when the reset lock is locked. In another embodiment, the activation valve does not include a reset lock.

Referring again to FIG. 2, the damper 30 may include a damper body 130, a base end 132 attached to the damper body 130, an interior chamber (e.g., a gas chamber 134), and a fluid line 136 for fluidly connecting the gas chamber 134 with the activation valve 32. Dashed lines represent the gas in the gas chamber 134, the fluid line 136, and the activation valve fluid line 52.

The fluid line 136 is formed in the base end 132 so that the gas chamber 134 is able to vent to the atmosphere and intake air from the atmosphere through the fluid line 136 and through the activation valve fluid line 52. The fluid line 136 includes a filter 138 to prevent contaminants from entering the gas chamber 134. In an embodiment, the fluid line is formed in another component of the damper, such as the damper body.

The fluid line 136 and the activation valve fluid line 52 may together form a single fluid line. For example, a seal 140 (e.g., an O-ring) between the base end 132 and the activation valve body 44 prevents fluid from leaking out between the fluid line 136 and the activation valve fluid line 52. In an embodiment, the fluid line is partially formed by a separate fluid line. In another embodiment, fluid line may be formed entirely by the damper or the activation valve.

The damper 30 may include an end cap 160, a primary piston 162, a primary piston rod 164 attached to the primary piston 162, a movable end 166 attached to the primary piston rod 164, a floating piston 168, a support tube 170 attached to the floating piston 168, and a flow regulator valve 174 within the support tube 170. The end cap 160 may seal against the primary piston rod 164 and the primary piston may seal against the damper body 130 to define an outer working chamber 176. The floating piston 168 may seal against the primary piston rod 164 to define an inner working chamber 178.

The base end 132 defines a base end cap and the damper body 130 may define recycling ports 180, 182, and 184 that fluidly connect the outer working chamber 176 to the inner working chamber 178 through the support tube 170. For example, the inner working chamber 178 is fluidly connectable to the recycling port 184 by an inner passage in the support tube 170 when the flow regulator valve 174 is opened to allow fluid to flow through a cylindrical space between the flow regulator valve 174 and the support tube 170. Dashed lines are provided to emphasize how the outer working chamber 176 and the inner working chamber 178 are fluidly connected to one another through the recycling ports 180, 182, and 184.

Both working chambers 176 and 178 may be fluidly isolated from the gas chamber 134. For example, the working chambers 176 and 178 are concentric and filled with a hydraulic fluid represented by dashed lines that are different than the dashed lines representing the gas in the gas chamber 134 (e.g., a hydraulic or an incompressible fluid, such as low-viscosity linear Polydimethylsiloxane). A ball seal 186 fluidly disconnects the fluid line 136 from the recycling port 184.

The flow regulator valve 174 may be a pressure compensated flow regulator valve (e.g., one of or multiple of Parker-Hannifin Corporation's Series FR101 pressure compensated flow regulator valves, or flow regulation components thereof) to regulate fluid flow from the inner working chamber 178 to the outer working chamber 176 and vice versa. Regulating fluid flow between the working chambers 176 and 178 allows the speed of the movable end 166 to be regulated, which allows the maximum retraction and extension speed of the movable end 166 to be limited to a predetermined speed.

For example, the flow regulator valve 174 includes springs 175, movable inner sleeves 177 with corresponding radial openings, and outer sleeves 179 that seal against the support tube 170 and that have corresponding radial openings. Each spring 175 independently biases the corresponding movable inner sleeve 177 in an open position (as shown in FIG. 2) where the radial openings of the movable inner sleeves 177 and the corresponding outer sleeves are aligned with one another. When in the open position, fluid is able to flow radially through the corresponding openings to or from the cylindrical space between the flow regulator valve 174 and the support tube 170.

As the movable end 166 extends or retracts, fluid pressure urges the movable inner sleeves 177 in a direction axially opposite to the movement direction of the movable end 166. When the movable end 166 accelerates to a speed above a predetermined speed threshold, the flow regulator valve 174 transitions into a reduced-flow state where one of the movable inner sleeves 177 separates from the corresponding outer sleeve 179 such that the corresponding openings become axially unaligned. As the openings become axially unaligned, the fluid flow radially through the corresponding openings is reduced, which increases resistance to continued movement of the movable end 166 in the same direction.

The support tube 170 may include a base-side portion 171 that is fixed to and sealed to a floating-piston-side portion 172. The base-side portion 171 and the floating-piston-side portion 172 are each axially and radially fixed to the flow regulator valve 174. For example, the base-side portion 171 and the floating-piston-side portion 172 each include a counterbored hole delimited by surfaces that abut an axial end and a radially outwardly facing surface of the corresponding outer sleeve 179.

In another embodiment, a different type of damper is utilized, such as a monotube. The monotube damper includes a gas chamber that is fluidly connectable to the fluid pressure source. In another embodiment, the damper is a twin tube damper. The twin tube damper includes an outer fluid chamber and a gas-filled portion in the outer fluid chamber. The gas-filled portion is fluidly connectable to the fluid pressure source.

When in the dampening state, the damper 30 dampens movement of the primary piston rod 164, thereby dampening movement of the movable end 166 when moving toward or away from the base end 132. Accordingly, when the door 26 (shown in FIG. 1) is opened or closed while the damper 30 is in the dampening state, the opening or closing movement of the door 26 is dampened. As mentioned above, the damper 30 may be in the dampening state regardless of the position of the door handle 36.

When the primary piston rod 164 extends, the gas chamber 134 intakes air from the atmosphere. When the primary piston rod 164 retracts, the gas chamber 134 vents air to the atmosphere. The air intake and venting is represented by two-way arrows adjacent to the puncture pin shaft 122.

Figure 5:
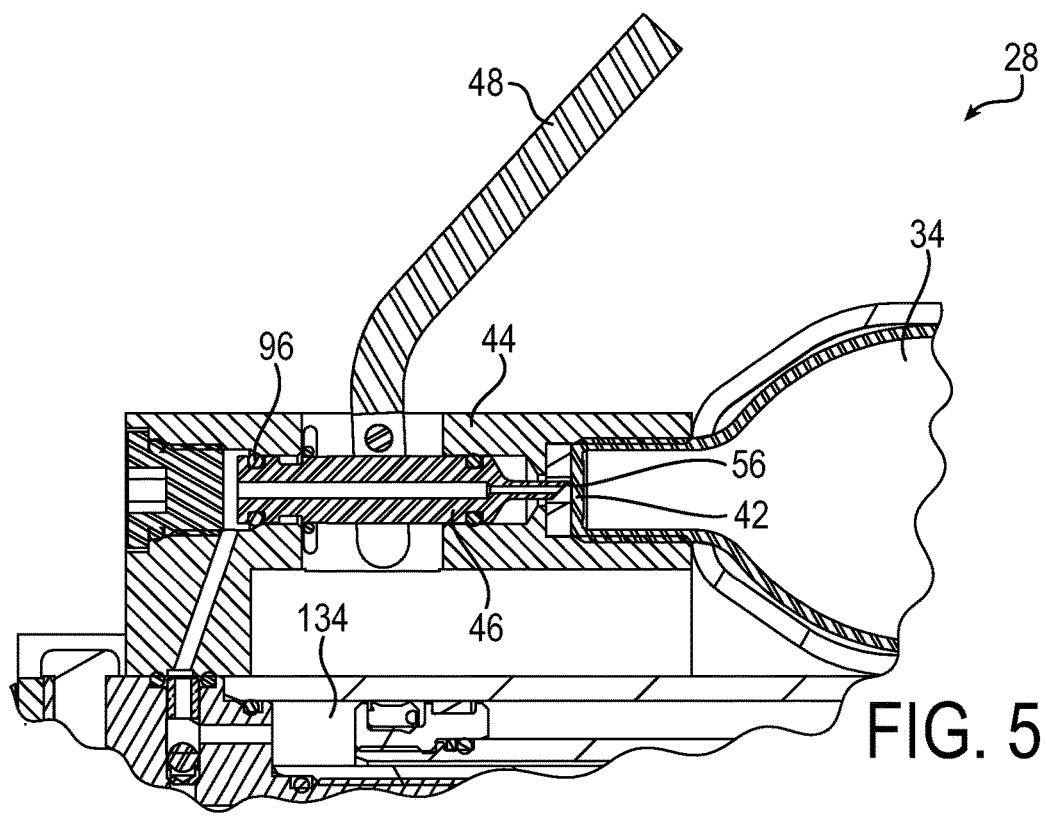
FIG. 5 is a partial front cross-sectional view of the dampening system of FIG. 2 in a sealed state.
Figure 6:
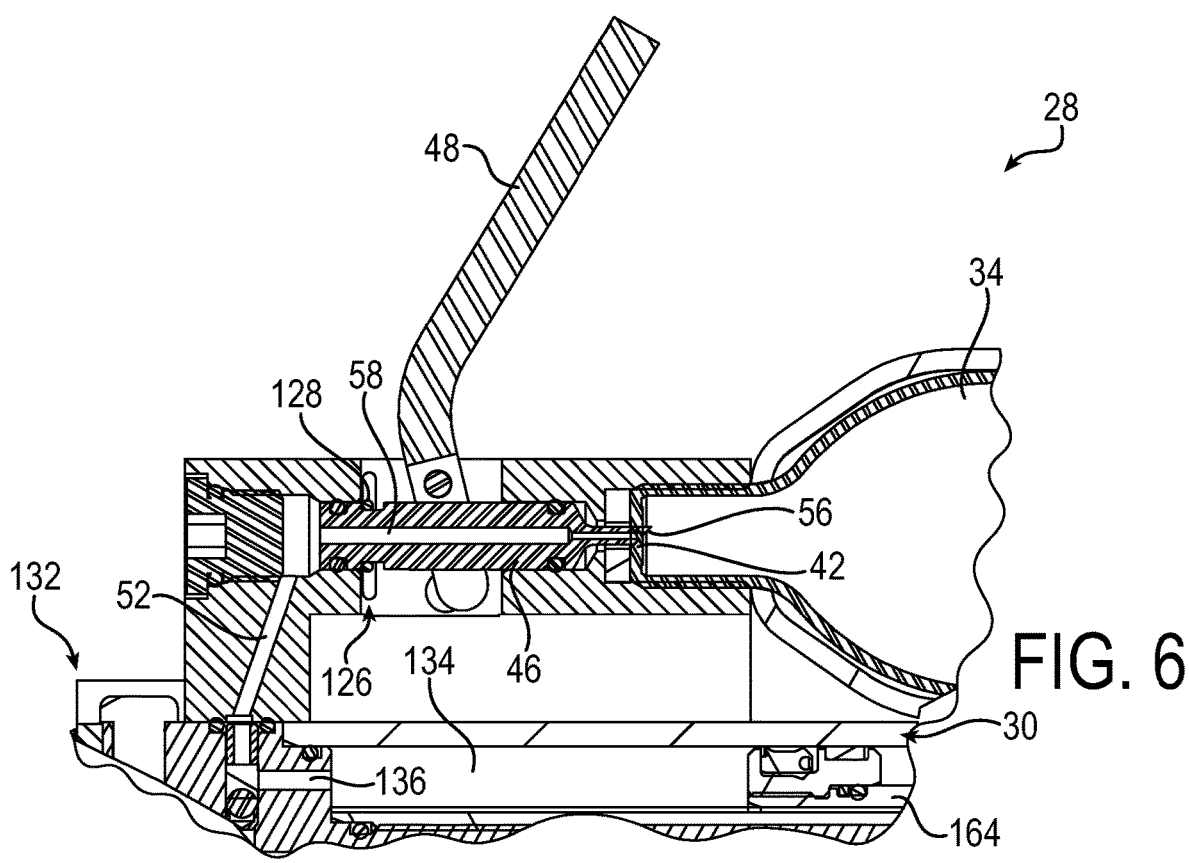
FIG. 6 is a partial front cross-sectional view of the dampening system of FIG. 2 in a reset-locked actuation state where an exemplary reset lock of the dampening system is in a locked state.

FIGS. 4-10 illustrate a progression of handle positions of the handle 48, which alter the state of the dampening system 28. Referring initially to FIGS. 4-6, a transition of the dampening system 28 from an unlocked dampening state to a sealed state to a reset-locked actuation state is illustrated. When the handle 48 is in the first handle position the single-use pressurized tank 34 is not fluidly connected to the gas chamber 134.

FIG. 4 illustrates the dampening system 28 as being in the unlocked dampening state where the handle 48 is in the first handle position and the actuation lock 50 is unlocked. Unlocking the actuation lock 50 (e.g., by removing the removable pin 88 shown in FIG. 3) allows the handle 48 to rotate about the handle pin 54. Once the removable pin 88 is removed, the handle 48 may be rotated about the handle pin 54 (e.g., counterclockwise as viewed in FIG. 4) from the first handle position toward the second handle position. In an embodiment, the dampening system does not include an actuation lock.

FIG. 5 illustrates the dampening system 28 as being in the sealed state where the handle 48 is shifted into an intermediate handle position between the first handle position and the second handle position. The vent seal 96 engages the activation valve body 44, which fluidly disconnects the gas chamber 134 from the atmosphere. Once the gas chamber 134 is disconnected from the atmosphere, the pointed end 56 of the puncture pin 46 may pierce the puncture cap 42.

FIG. 6 illustrates the dampening system 28 as being in the reset-locked actuation state where reset lock 126 is in a locked state and the damper 30 is shifted to the actuation state. The handle 48 is shifted into the second handle position to lock the reset lock 126 and to shift the damper 30 into the actuation state. As mentioned above, the damper 30 may be in the actuation state regardless of the position of the door handle 36.

Locking the reset lock 126 may prevent the handle 48 from moving back to the first handle position so that the handle 48 and the puncture pin 46 cannot be reset after the single-use pressurized tank 34 is depressurized. Preventing reset may prevent a user from accidentally resetting the handle 48 or attempting to use the dampening system 28 before the depressurized single-use pressurized tank 34 is replaced with a new single-use pressurized tank 34.

When in the actuation state, the gas chamber 134 is disconnected from the atmosphere, and the pointed end 56 of the puncture pin 46 punctures the puncture cap 42 to fluidly connect the gas chamber 134 to the single-use pressurized tank 34. In an embodiment, the pointed end punctures the puncture cap at the same time as or just after the interior chamber is disconnected from the atmosphere.

Once the gas chamber 134 is fluidly connected to the single-use pressurized tank 34, the gas inside the single-use pressurized tank 34 flows through the axial through passage 58 and through the fluid lines 136 and 52 to begin pressurizing the gas chamber 134. Pressurizing the gas chamber 134 urges the primary piston rod 164 away from the base end 132 such that the primary piston rod 164 along with the movable end 166 (shown in FIG. 2) actuates away from the base end 132.

The amount of time required to fully-actuate the primary piston rod 164 depends upon the initial pressure within the single-use pressurized tank 34 and the load applied to the primary piston rod 164 (e.g., the door 26 shown in FIG. 1). The primary piston rod 164 may be fully-actuated to fully-open the door 26 after anywhere from 1 to 8 seconds when the single-use pressurized tank 34 is initially pressurized at 2700 pounds per square inch (psi) and when the door 26 weighs 250-500 pounds (lbs.). In an embodiment, the door is only partially opened to allow the user to exit the vehicle.

Once the handle 48 is in the second handle position, the retaining ring 128 moves into the locked position to prevent the puncture pin 46 from moving away from the single-use pressurized tank 34.

Figure 7:
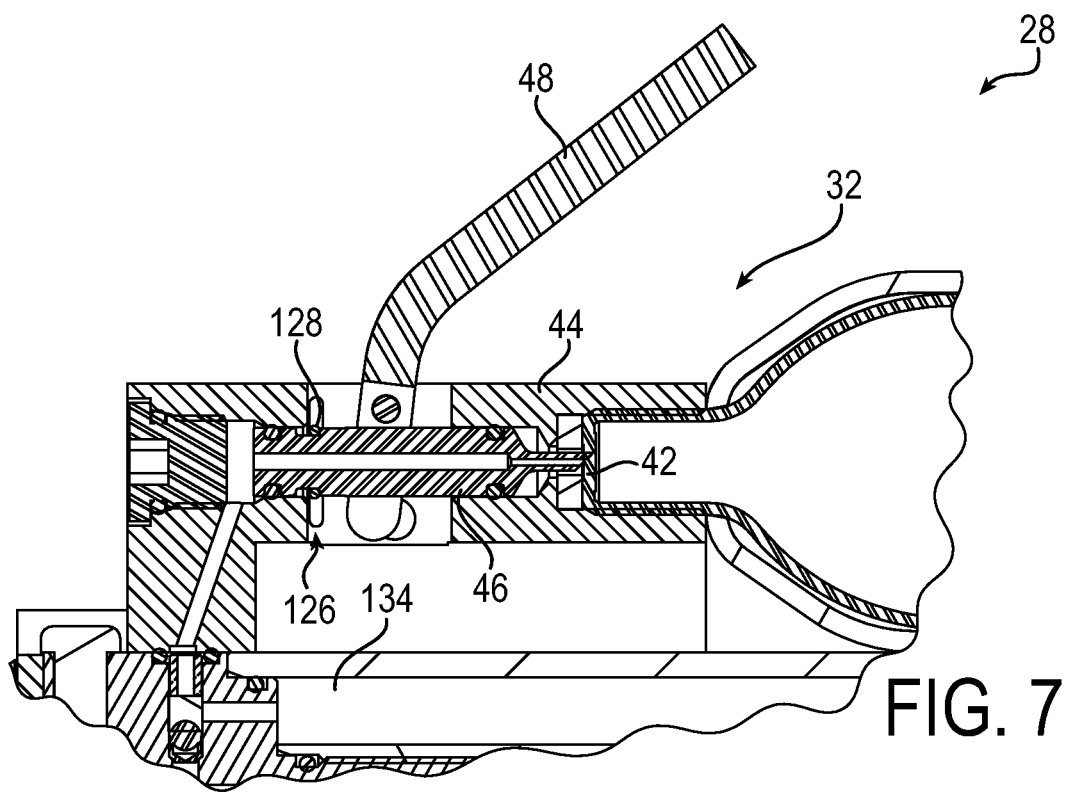
FIG. 7 is a partial front cross-sectional view of the dampening system of FIG. 2 in another reset-locked actuation state.
Figure 8:
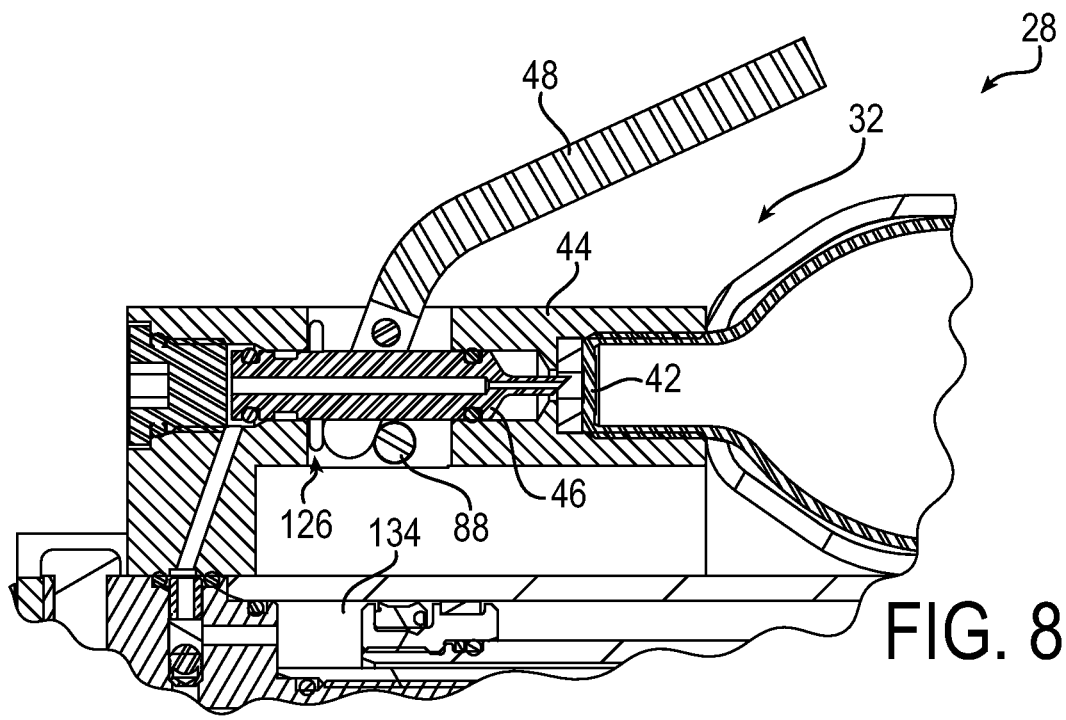
FIG. 8 is a partial front cross-sectional view of the dampening system of FIG. 2 in a reset-unlocked dampening state.

Referring now to FIGS. 7 and 8, a transition of the dampening system 28 from another reset-locked actuation state to a reset-unlocked dampening state is illustrated. When in the reset-unlocked dampening state the activation valve 32 may be reset. The reset lock 126 may be unlocked, the handle 48 may be moved back to the first handle position, and the reset lock 126 may be reset to the unlocked state.

For example, the retaining ring 128 is removed to allow the handle 48 to move back to the first handle position. The handle 48 is shifted to a third handle position (e.g., the first handle position or closer to the first handle position than the second handle position) such that the gas chamber 134 is fluidly connected to the atmosphere. In an embodiment, the handle is shifted to a third handle position that allows the interior chamber to vent to the atmosphere, where the handle is further from the first handle position than when in the second handle position.

Connecting the gas chamber 134 to the atmosphere allows the gas chamber 134 to vent the pressure within the gas chamber 134 so that the dampening system 28 may be reset to a fully-reset dampening state. The removable pin 88 may be reinserted into the activation valve body 44, when the handle 48 is back in the first handle position, to again prevent the handle 48 from actuating the puncture pin 46 toward the puncture cap 42.

Figure 9:
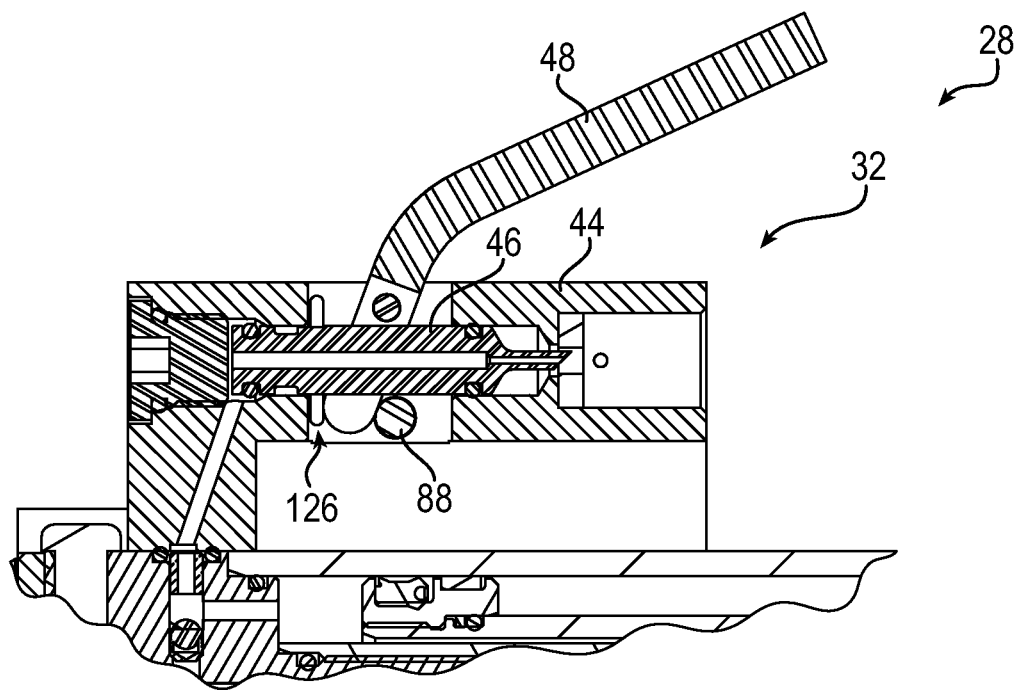
FIG. 9 is a partial front cross-sectional view of the dampening system of FIG. 2 in the reset-unlocked dampening state where a fluid pressure source of the dampening system has been removed.
Figure 10:
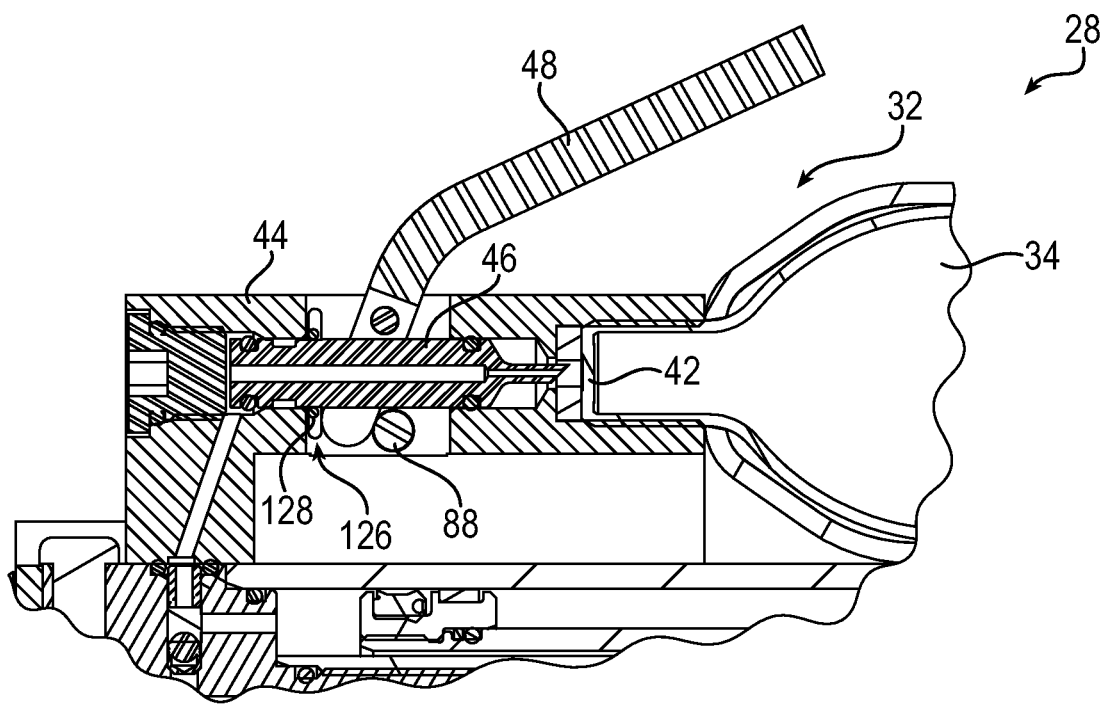
FIG. 10 is a partial front cross-sectional view of the dampening system of FIG. 2 in a fully-reset dampening state where the fluid pressure source has been replaced and the reset lock has been reset.

Referring now to FIGS. 9 and 10, a transition of the dampening system 28 from a reset-unlocked dampening state to the fully-reset dampening state is illustrated. The single-use pressurized tank 34 may be disconnected from the activation valve 32 after a single use (e.g., a single puncture of the puncture cap 42) that depressurizes the single-use pressurized tank 34. A new single-use pressurized tank 34 may replace the now depressurized single-use pressurized tank 34 by coupling the new single-use pressurized tank 34 to the activation valve 32.

The reset lock 126 may be reset to the locked state. For example, after the removable pin 88 is reinserted into the activation valve body 44 the retaining ring 128 may be reinserted into the activation valve body 44 to again abut the radially outer surface of the puncture pin 46. In an embodiment, the retaining ring is reinserted into the activation valve body regardless of whether the removable pin is inserted in the activation valve body.

When the activation valve 32 is fully reset and the single-use pressurized tank 34 is replaced, the dampening system 28 is in the fully-reset dampening state. At this point, the dampening system 28 is again in the unlocked dampening state illustrated in FIG. 2.

A dampening system may include a damper, a fluid line, a fluid pressure source, and an activation valve. The damper may have an interior chamber, a base end, and a movable end that is actuatable relative to the base end based on a pressure within the interior chamber. The fluid line may be fluidly connected to the interior chamber. The fluid pressure source may be fluidly connectable to the interior chamber through the fluid line. The activation valve may be operably coupled to the damper and to the fluid pressure source. When the activation valve is in a first position the fluid pressure source may not fluidly connect to the interior chamber. When the activation valve shifts to a second position, the damper may be shifted into an actuation state where the fluid pressure source is fluidly connected to the interior chamber such that the fluid pressure source pressurizes the interior chamber, thereby actuating the movable end of the damper relative to the base end.

The fluid pressure source may include a single-use pressurized tank. The fluid pressure source may be a compressed gas disposable cylinder.

The movable end extends away from the base end when in the actuation state.

When the activation valve is in the first position the dampening system may be in a dampening state where the damper dampens movement of the movable end.

The activation valve may include a puncture pin that is pressure balanced with an axial through passage, and may include a handle that is operably coupled to the puncture pin and movable from a first handle position to a second handle position, wherein when the handle is in the second handle position the puncture pin may puncture the fluid pressure source such that fluid from the fluid pressure source would flow through the axial through passage to the interior chamber through the fluid line.

The handle may be rotatable from the first handle position to the second handle position.

The dampening system may further include a reset lock operably coupled to the activation valve such that when the activation valve is in the second position the reset lock may prevent the activation valve from returning to the first position.

The activation valve may include a puncture pin that includes a radially outwardly facing notch. The reset lock may include a retaining ring that allows the activation valve to shift from the first position to the second position, and when the activation valve is in the second position the retaining ring may engage the radially outwardly facing notch to prevent the activation valve from shifting to the first position.

When the activation valve is in the second position the interior chamber may be fluidly disconnected from atmosphere.

When the activation valve is in a third position the interior chamber may be fluidly connected to atmosphere.

When the activation valve is in the first position the interior chamber may be fluidly connected to atmosphere.

The damper may include a flow regulator valve that regulates a speed of the movable end when the movable end extends and/or retracts.

A vehicle may include the dampening system, a door housing, and a door. The door housing may define a doorway. The door that may be movably coupled to the door housing such that the door is movable from a closed position where the door blocks the doorway to an open position where a user is able to move entirely through the doorway. The movable end of the damper may be coupled to the door. When the movable end of the damper is actuated relative to the base end the door may be moved between the closed position and the open position.

A method of using the dampening system or vehicle may include shifting the activation valve from the first position to the second position such that the damper may be shifted into the actuation state and the fluid pressure source may be fluidly connected to the interior chamber such that the fluid pressure source pressurizes the interior chamber. The movable end of the damper may be actuated relative to the base end based on the pressure within the interior chamber.

The activation valve may be shifted from the second position to a third position such that the interior chamber is fluidly connected to atmosphere. The pressure within the interior chamber may be vented to atmosphere.

A door positioning system may include a door housing, a door, and a door actuation system. The door housing may define a doorway. The door may be movably coupled to the door housing such that the door is movable from a closed position where the door blocks the doorway to an open position. The door actuation system may include an actuator, a fluid line, a single-use pressurized tank, and an activation valve. The actuator may have an interior chamber, a base end, and a movable end that is actuatable relative to the base end based on a pressure within the interior chamber. The actuator may be coupled to the door. The fluid line may be fluidly connected to the interior chamber. The single-use pressurized tank maybe fluidly connectable to the interior chamber through the fluid line. The activation valve may be operably coupled to the actuator and to the single-use pressurized tank. When the activation valve is in a first position the single-use pressurized tank may not fluidly connect to the interior chamber. When the activation valve shifts to a second position the actuator may be shifted into an actuation state where the single-use pressurized tank may be fluidly connected to the interior chamber to pressurize the interior chamber, thereby actuating the movable end of the actuator relative to the base end and moving the door between the closed position and the open position.

The single-use pressurized tank may be a compressed gas disposable cylinder with a puncture cap.

When the activation valve is in the second position, the movable end of the actuator may open the door such that a user is able to move entirely through the doorway.

The door may include a door handle and the actuator may shift into the actuation state regardless of the position of the door handle. The actuator may be able to shift into or from a dampening state regardless of the position of the handle.

A vehicle may include the door actuation system.

A method of using the door positioning system or the vehicle may include shifting the activation valve from the first position to the second position such that the actuator may be shifted into the actuation state and the single-use pressurized tank may be fluidly connected to the interior chamber such that the single-use pressurized tank pressurizes the interior chamber. The movable end of the actuator may be actuated relative to the base end based on the pressure within the interior chamber such that the door may be moved between the closed position and the open position.

The single-use pressurized tank may be disconnected from the activation valve after a single use. The single-use pressurized tank may be a first single-use pressurized tank that is depressurized. The depressurized first single-use pressurized tank may be replaced with a second single-use pressurized tank by coupling the second single-use pressurized tank to the activation valve.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A dampening system including:
   a damper having an interior chamber, a base end, and a movable end that is actuatable relative to the base end based on a pressure within the interior chamber;
   a fluid line fluidly connected to the interior chamber;
   a fluid pressure source fluidly connectable to the interior chamber through the fluid line; and
   an activation valve operably coupled to the damper and to the fluid pressure source;
   wherein when the activation valve is in a first position the fluid pressure source is not fluidly connected to the interior chamber, and the dampening system is in a dampening state where the damper dampens movement of the movable end;
   wherein when the activation valve shifts to a second position, the damper is shifted into an actuation state where the fluid pressure source is fluidly connected to the interior chamber such that the fluid pressure source pressurizes the interior chamber, thereby actuating the movable end of the damper relative to the base end;
   wherein the activation valve includes a puncture pin that is pressure balanced with an axial through passage, and includes a handle that is operably coupled to the puncture pin and moveable from a first handle position to a second handle position, and
   wherein when the handle is in the second handle position the puncture pin punctures the fluid pressure source such that fluid from the fluid pressure source would flow through the axial through passage to the interior chamber through the fluid line.

2. The dampening system of claim 1, wherein the fluid pressure source includes a single-use pressurized tank.

3. The dampening system of claim 1, wherein the movable end extends away from the base end when in the actuation state.

4. The dampening system of claim 1, further including a reset lock operably coupled to the activation valve such that when the activation valve is in the second position the reset lock prevents the activation valve from returning to the first position.

5. The dampening system of claim 4, wherein the puncture pin includes a radially outwardly facing notch; and
   wherein the reset lock includes a retaining ring that allows the activation valve to shift from the first position to the second position, and when the activation valve is in the second position the retaining ring engages the radially outwardly facing notch to prevent the activation valve from shifting to the first position.

6. The dampening system of claim 1, wherein when the activation valve is in the second position the interior chamber is fluidly disconnected from atmosphere.

7. The dampening system of claim 1, wherein when the activation valve is in a third position the interior chamber is fluidly connected to atmosphere.

8. The dampening system of claim 1, wherein when the activation valve is in the first position the interior chamber is fluidly connected to atmosphere.

9. The dampening system of claim 1, wherein the damper includes a flow regulator valve that regulates a speed of the movable end when the movable end extends and/or retracts.

10. A vehicle including:
    the dampening system of claim 1;
    a door housing defining a doorway;
    a door that is movably coupled to the door housing such that the door is movable from a closed position where the door blocks the doorway to an open position where a user is able to move entirely through the doorway, wherein the movable end of the damper is coupled to the door;
    wherein when the movable end of the damper is actuated relative to the base end the door would be moved between the closed position and the open position.

11. A method of using the dampening system of claim 1 including:
    shifting the activation valve from the first position to the second position such that the damper is shifted into the actuation state and the fluid pressure source is fluidly connected to the interior chamber such that the fluid pressure source pressurizes the interior chamber; and actuating the movable end of the damper relative to the base end based on the pressure within the interior chamber.

12. The method of claim 11 further including:

shifting the activation valve from the second position to a third position such that the interior chamber is fluidly connected to atmosphere; and venting the pressure within the interior chamber to atmosphere.

13. A door positioning system including:

a door housing defining a doorway;

a door that is movably coupled to the door housing such that the door is movable from a closed position where the door blocks the doorway to an open position where a user is able to move entirely through the doorway;

a door actuation system including:

an actuator having an interior chamber, a base end, and a movable end that is actuatable relative to the base end based on a pressure within the interior chamber, wherein the actuator is coupled to the door;

a fluid line fluidly connected to the interior chamber;

a single-use pressurized tank fluidly connectable to the interior chamber through the fluid line; and an activation valve operably coupled to the actuator and to the single-use pressurized tank; and wherein when the activation valve is in a first position the single-use pressurized tank is not fluidly connected to the interior chamber;

wherein when the activation valve shifts to a second position the actuator is shifted into an actuation state where the single-use pressurized tank is fluidly connected to the interior chamber to pressurize the interior chamber, thereby actuating the movable end of the actuator relative to the base end and moving the door between the closed position and the open position;

wherein the activation valve includes a puncture pin that is pressure balanced with an axial through passage, and includes a handle that is operably coupled to the puncture pin and moveable from a first handle position to a second handle position, and wherein when the handle is in the second handle position the puncture pin punctures the single-use pressurized tank such that fluid from the single-use pressurized tank would flow through the axial through passage to the interior chamber through the fluid line.

14. The door positioning system of claim 13, wherein the single-use pressurized tank is a compressed gas disposable cylinder with a puncture cap.

15. The door positioning system of claim 13, wherein when the activation valve is in the second position, the movable end of the actuator opens the door such that the user is able to move entirely through the doorway.

16. The door positioning system of claim 13, wherein the door includes a door handle and the actuator shifts into the actuation state regardless of whether the door handle is in an open or closed position.

17. A vehicle including:

the door actuation system of claim 13.

18. A method of using the door positioning system of claim 13 including:

shifting the activation valve from the first position to the second position such that the actuator is shifted into the actuation state and the single-use pressurized tank is fluidly connected to the interior chamber such that the single-use pressurized tank pressurizes the interior chamber; and actuating the movable end of the actuator relative to the base end based on the pressure within the interior chamber such that the door is moved between the closed position and the open position.

19. The method of claim 18 further including:

disconnecting the single-use pressurized tank from the activation valve after a single use, wherein the single-use pressurized tank is a first single-use pressurized tank that is depressurized; and replacing the depressurized first single-use pressurized tank with a second single-use pressurized tank by coupling the second single-use pressurized tank to the activation valve.

20. A dampening system including:

a damper having an interior chamber, a base end, and a movable end that is actuatable relative to the base end based on a pressure within the interior chamber;

a fluid line fluidly connected to the interior chamber;

a fluid pressure source fluidly connectable to the interior chamber through the fluid line;

an activation valve operably coupled to the damper and to the fluid pressure source, wherein when the activation valve is in a first position the fluid pressure source is not fluidly connected to the interior chamber and the dampening system is in a dampening state where the damper dampens movement of the movable end, and wherein when the activation valve shifts to a second position the damper is shifted into an actuation state where the fluid pressure source is fluidly connected to the interior chamber such that the fluid pressure source pressurizes the interior chamber, thereby actuating the movable end of the damper relative to the base end; and a reset lock operably coupled to the activation valve such that when the activation valve is in the second position the reset lock prevents the activation valve from returning to the first position.

* * * * *